United States Patent
Chang et al.

(10) Patent No.: US 12,321,678 B2
(45) Date of Patent: Jun. 3, 2025

(54) INTEGRATED CIRCUIT WITH COMPACT LAYOUT ARRANGEMENT

(71) Applicant: MEDIATEK INC., Hsin-Chu (TW)

(72) Inventors: Yu-Tung Chang, Hsinchu (TW); Yi-Chun Tsai, Hsinchu (TW); Tung-Kai Tsai, Hsinchu (TW); Yi-Te Chiu, Hsinchu (TW); Shih-Yun Lin, Hsinchu (TW); Hung-Ming Chu, Hsinchu (TW); Yi-Feng Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 619 days.

(21) Appl. No.: 17/673,755

(22) Filed: Feb. 16, 2022

(65) Prior Publication Data

US 2022/0366116 A1 Nov. 17, 2022

Related U.S. Application Data

(60) Provisional application No. 63/188,514, filed on May 14, 2021.

(51) Int. Cl.
*G06F 30/392* (2020.01)

(52) U.S. Cl.
CPC .................. *G06F 30/392* (2020.01)

(58) Field of Classification Search
CPC ........ G06F 21/57; G06F 21/73; G06F 21/335; G06F 21/45; G06F 21/71; G06F 21/87; G06F 1/26; G06F 1/3203; G06F 1/3237; G06F 1/3243; G06F 1/3275; G06F 1/3287; G06F 1/3296; G06F 30/398; G06F 2119/12; G06F 30/34; G06F 30/367; G06F 30/39; G06F 9/382; G06F 2111/14; G06F 2113/18; G06F 17/11; G06F 30/394; G06F 30/327; G06F 30/392; G06F 12/1408; G06F 15/76; G06F 21/445; G06F 21/606;
(Continued)

(56) References Cited

U.S. PATENT DOCUMENTS

2003/0023936 A1 1/2003 McManus
2003/0023937 A1 1/2003 McManus
(Continued)

FOREIGN PATENT DOCUMENTS

TW 538453 6/2003
TW 201426946 A 7/2014
(Continued)

*Primary Examiner* — Binh C Tat
(74) *Attorney, Agent, or Firm* — Winston Hsu (57) ABSTRACT

An integrated circuit (IC) may include a plurality of functional blocks, and each functional block of the plurality of functional blocks may include hardware circuits, wherein the plurality of functional blocks may include a first functional block. In addition, the first functional block may include a first macro circuit that is positioned within a first sub-region of the first functional block, wherein among multiple sides of the first sub-region, a first side of the first sub-region is closest to a boundary of the first functional block. Additionally, a first intermediate sub-region of the first functional block is positioned between the first side of the first sub-region and the boundary of the first functional block, and there is no tap cell in the first intermediate sub-region of the first functional block.

9 Claims, 7 Drawing Sheets

(58) Field of Classification Search
CPC ...... G06F 21/72; G06F 21/85; G06F 2111/08; G06F 2119/18; G06F 2207/5523; G06F 2221/2103; G06F 30/20; G06F 7/483; G06F 7/50; G06F 7/552; G06F 21/608; G06F 2111/20; G06F 2115/06; G06F 2119/04; G06F 2119/06; G06F 2119/08; G06F 30/3312; G06F 30/3953; G03F 1/70; H01L 2225/0651; H01L 2224/73265; H01L 23/5386; H01L 2224/214; H01L 2225/06544; H01L 27/0207; H01L 23/528; H01L 21/486; H01L 2924/15311; H01L 2224/08; H01L 24/19
USPC .................................................. 716/118–125
See application file for complete search history.

(56) References Cited

U.S. PATENT DOCUMENTS

| | | | | |
|---|---|---|---|---|
| 2018/0330038 | A1* | 11/2018 | Shehata | G06F 30/398 |
| 2019/0326296 | A1* | 10/2019 | Wang | H01L 27/124 |
| 2019/0340325 | A1* | 11/2019 | Herrling | G06F 30/394 |

FOREIGN PATENT DOCUMENTS

| | | |
|---|---|---|
| TW | 201824036 A | 7/2018 |
| TW | 202018921 A | 5/2020 |

* cited by examiner

INTEGRATED CIRCUIT WITH COMPACT LAYOUT ARRANGEMENT

CROSS REFERENCE TO RELATED APPLICATIONS

This application claims the benefit of U.S. Provisional Application No. 63/188,514, which was filed on May 14, 2021, and is included herein by reference.

BACKGROUND

The present invention is related to circuit design, and more particularly, to an integrated circuit (IC) with compact layout arrangement.

According to the related art, a control circuit in an electronic device can be implemented by way of IC fabrication. For example, a design house can design a circuit such as the control circuit according to some design rules, and the manufacturing process can be performed in one or more highly specialized semiconductor fabrication plants, which can be referred to as foundries or fabs. During a mass production phase of the IC, the number of dies that can be obtained from a wafer may depend on the size of the dies, and the overall cost may depend on the number of dies that function correctly among all dies obtained from the wafer. Although the related art may have made an effort to improve the yield rate, it would seem that the cost cannot be further reduced due to a bottleneck. Thus, there is a need for a novel method and associated architecture to save the overall circuit area of the IC without introducing a side effect or in a way that is less likely to introduce a side effect.

SUMMARY

It is an objective of the present invention to provide an IC, for example, with compact layout arrangement, in order to solve the above-mentioned problems.

At least one embodiment of the present invention provides an IC. For example, the IC may comprise a plurality of functional blocks, and each functional block of the plurality of functional blocks may comprise hardware circuits, wherein the plurality of functional blocks may comprise a first functional block. In addition, the first functional block may comprise a first macro circuit that is positioned within a first sub-region of the first functional block, wherein among multiple sides of the first sub-region, a first side of the first sub-region is closest to a boundary of the first functional block. Additionally, a first intermediate sub-region of the first functional block is positioned between the first side of the first sub-region and the boundary of the first functional block, and there is no tap cell in the first intermediate sub-region of the first functional block.

It is an advantage of the present invention that, through proper design, the present invention IC can be equipped with compact layout arrangement. In comparison with the related art, the present invention IC can operate correctly in various situations while the overall circuit area of the IC has been further reduced, where the associated cost can be further reduced correspondingly.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
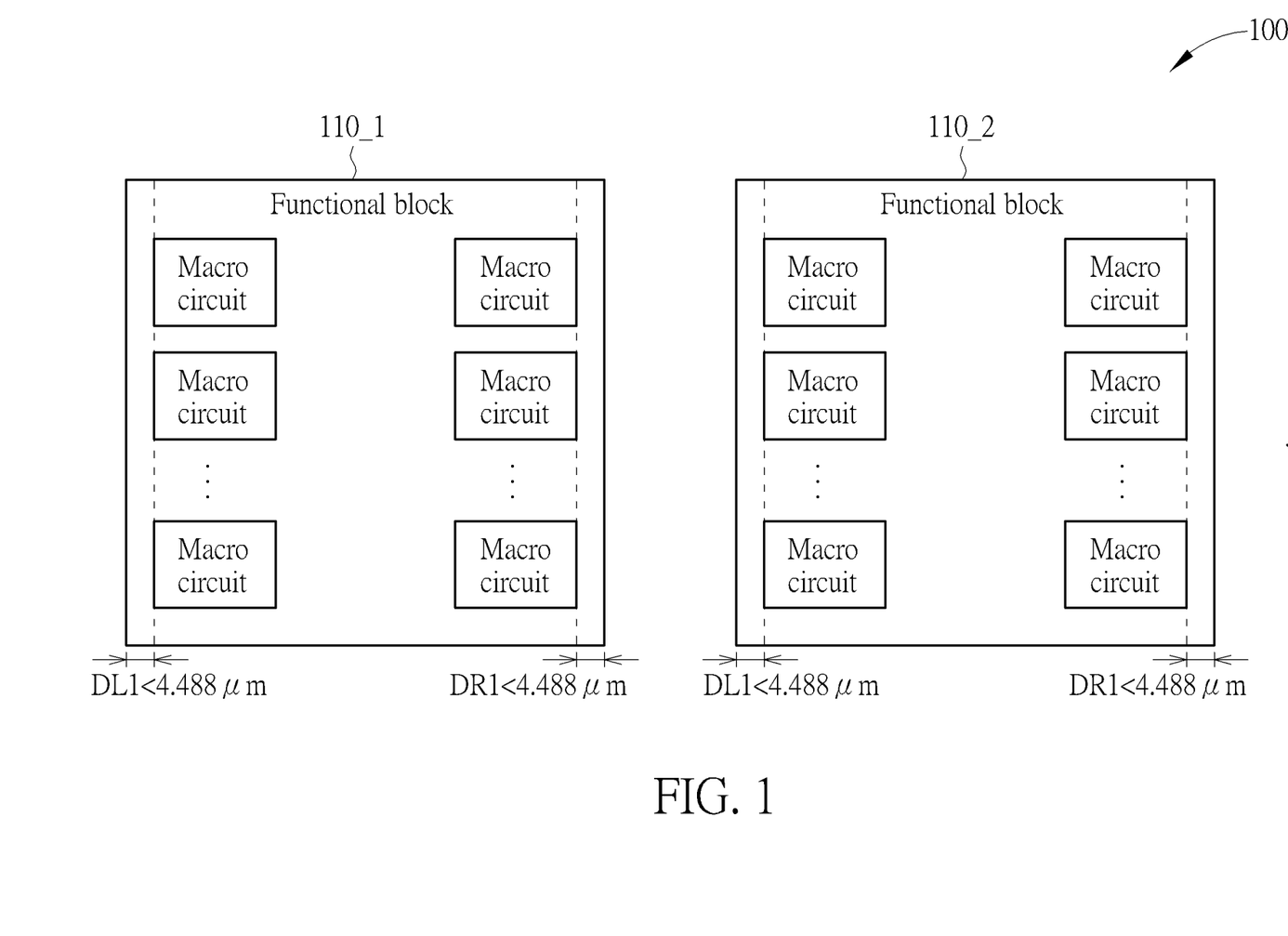
FIG. 1 is a diagram of an IC according to an embodiment of the present invention.

FIG. 1 is a diagram of an IC 100 according to an embodiment of the present invention. The IC 100 may comprise a plurality of functional blocks such as the functional blocks 110_1, 110_2, etc., and each functional block of the plurality of functional blocks may comprise hardware circuits such as a plurality of macro circuits. Examples of any macro circuit among the plurality of macro circuits may include, but are not limited to: a Static Random Access Memory (SRAM), an Intellectual Property (IP) module, etc. For better comprehension, the IC 100 may represent a control circuit in an electronic device, and more particularly, may represent a processing circuit comprising at least one processor/microprocessor, etc., but the present invention is not limited thereto.

As shown in FIG. 1, in any functional block (e.g., each functional block) among the plurality of functional blocks, such as the functional blocks 110_$i$ among the functional blocks 110_1, 110_2, etc. (e.g., the functional block index i may represent a positive integer), the distance DL1 between a first boundary line (e.g., the boundary line at the left-hand side) of the any functional block and the macro circuits that are close to the first boundary line (e.g., the boundary line at the left-hand side) of the any functional block is less than 4.488 micrometers (μm), and the distance DR1 between another boundary line (e.g., the boundary line at the right-hand side) of the any functional block and the macro circuits that are close to the other boundary line (e.g., the boundary line at the right-hand side) of the any functional block is less than 4.488 μm.

Based on the architecture shown in FIG. 1, the IC 100 can be equipped with compact layout arrangement. In comparison with the related art, the IC 100 can operate correctly in various situations while the overall circuit area of the IC 100 has been further reduced. As a result, the associated cost can be further reduced correspondingly.

Figure 2:
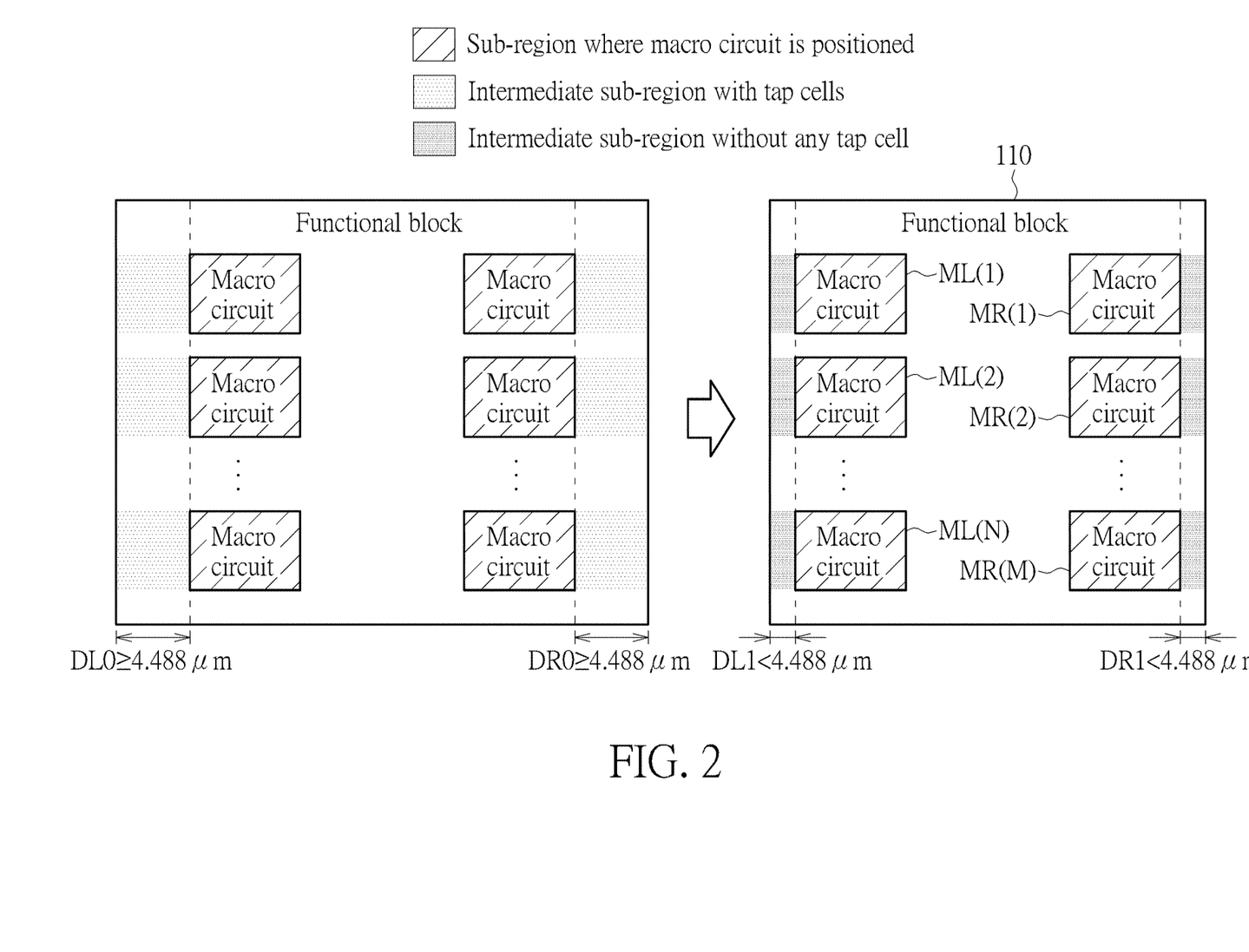
FIG. 2 is a diagram illustrating, in the right half thereof, a compact layout control scheme of a method for implementing an IC such as the IC shown in FIG. 1 according to an embodiment of the present invention, where a non-compact layout control scheme is illustrated in the left half of FIG. 2 for better comprehension.

FIG. 2 is a diagram illustrating, in the right half thereof, a compact layout control scheme of a method for implementing an IC such as the IC 100 shown in FIG. 1 according to an embodiment of the present invention, where a non-compact layout control scheme is illustrated in the left half of FIG. 2 for better comprehension. In an IC implemented according to the non-compact layout control scheme as shown in the left half of FIG. 2, each intermediate sub-region of the intermediate sub-regions between the boundary of a functional block in this IC and the macro circuits in this functional block may comprise multiple tap cells (labeled "Intermediate sub-region with tap cells" for brevity), and more particularly, comprise a first one-dimensional (1D) array of boundary cells positioned at one side of the multiple tap cells and further comprise a second 1D array of boundary cells positioned at the other side of the multiple tap cells. As a result, the distance DL0 between a left boundary line (e.g., the boundary line at the left-hand side) of the functional block and the macro circuits that are close to the left boundary line is typically greater than or equal to 4.488 μm (labeled "DL0≥4.488 μm" for brevity), and the distance DR0 between a right boundary line (e.g., the boundary line at the right-hand side) of the functional block and the macro circuits that are close to the right boundary line is typically greater than or equal to 4.488 μm (labeled "DR0≥4.488 μm" for brevity).

In the IC 100 implemented according to the compact layout control scheme as shown in the right half of FIG. 2, each intermediate sub-region of the intermediate sub-regions between the boundary of a first functional block 110 (labeled "Functional block" for brevity) among the plurality of functional blocks of the IC 100 and the macro circuits in the functional block 110 does not comprise any tap cell (labeled "Intermediate sub-region without any tap cell" for brevity). The first functional block 110 may represent the any functional block among the plurality of functional blocks, such as the functional blocks 110_i among the functional blocks 110_1, 110_2, etc. The first functional block 110 may comprise a first set of macro circuits ML(1), ML(2), ... and ML(N) that are close to the first boundary line (e.g., the boundary line at the left-hand side) of the first functional block 110, and may further comprise a second set of macro circuits MR(1), MR(2), ... and MR(M) that are close to the other boundary line (e.g., the boundary line at the right-hand side) of the first functional block 110, where any macro circuit count (e.g., each macro circuit count) among the macro circuit count N of the first set of macro circuits ML(1), ML(2), ... and ML(N) and the macro circuit count M of the second set of macro circuits MR(1), MR(2), ... and MR(M) can be a positive integer that is greater than two, and more particularly, can be a positive integer that is much greater than two, but the present invention is not limited thereto. For example, the first functional block 110 may further comprise one or more sets of macro circuits, such as other sets of macro circuits that are positioned between the first set of macro circuits ML(1), ML(2), ... and ML(N) and the second set of macro circuits MR(1), MR(2), ... and MR(M).

Taking the $n^{th}$ macro circuit among the first set of macro circuits ML(1), ML(2), ... and ML(N) as an example, the first functional block 110 may comprise a first macro circuit ML(n) that is positioned within a first sub-region of the first functional block 110, where the macro circuit index n can be a positive integer falling within the interval [1, N]. Among multiple sides of the first sub-region, such as the four sides of the sub-region where the first macro circuit ML(n) is positioned, a first side (e.g., the left side) of the first sub-region is closest to the boundary of the first functional block 110. In addition, a first intermediate sub-region of the first functional block 110 is positioned between the first side (e.g., the left side) of the first sub-region (e.g., the sub-region where the first macro circuit ML(n) is positioned) and the boundary of the first functional block 110, and there is no tap cell in the first intermediate sub-region of the first functional block 110. As a result, the distance between the first side of the first sub-region and the boundary of the first functional block 110, such as the distance DL1 between the first macro circuit ML(n) and the first boundary line (e.g., the boundary line at the left-hand side) of the first functional block 110, is less than 4.488 μm (labeled "DL1<4.488 μm" for brevity).

Similarly, taking the $m^{th}$ macro circuit among the second set of macro circuits MR(1), MR(2), ... and MR(M) as an example, the first functional block 110 may comprise another first macro circuit MR(m) that is positioned within another first sub-region of the first functional block 110, where the macro circuit index m can be a positive integer falling within the interval [1, M]. Among multiple sides of the other first sub-region, such as the four sides of the sub-region where the other first macro circuit MR(m) is positioned, a first side (e.g., the right side) of the other first sub-region is closest to the boundary of the first functional block 110. In addition, another first intermediate sub-region of the first functional block 110 is positioned between the first side (e.g., the right side) of the other first sub-region (e.g., the sub-region where the other first macro circuit MR(m) is positioned) and the boundary of the first functional block 110, and there is no tap cell in the other first intermediate sub-region of the first functional block 110. As a result, the distance between the first side of the other first sub-region and the boundary of the first functional block 110, such as the distance DR1 between the other first macro circuit MR(m) and the other boundary line (e.g., the boundary line at the right-hand side) of the first functional block 110, is less than 4.488 μm (labeled "DR1<4.488 μm" for brevity).

According to this embodiment, the boundary of the first functional block 110 may comprise multiple boundary lines such as four boundary lines on the four sides of the first functional block 110, where the first intermediate sub-region of the first functional block 110 is positioned between the first side (e.g., the left side) of the first sub-region (e.g., the sub-region where the first macro circuit ML(n) is positioned) and the first boundary line (e.g., the boundary line at the left-hand side) among the multiple boundary lines, and the other first intermediate sub-region of the first functional block 110 is positioned between the first side (e.g., the right side) of the other first sub-region (e.g., the sub-region where the other first macro circuit MR(m) is positioned) and the other boundary line (e.g., the boundary line at the right-hand side) among the multiple boundary lines.

According to some embodiments, any of the first macro circuit ML(n) and the other first macro circuit MR(m) can be an SRAM. For example, any of the first set of macro circuits ML(1), ML(2), . . . and ML(N) can be an SRAM. For another example, any of the second set of macro circuits MR(1), MR(2), . . . and MR(M) can be an SRAM. In some examples, at least one macro circuit (e.g., one or more macro circuits) among the first set of macro circuits ML(1), ML(2), . . . and ML(N) and the second set of macro circuits MR(1), MR(2), . . . and MR(M) can be an SRAM.

Figure 3:
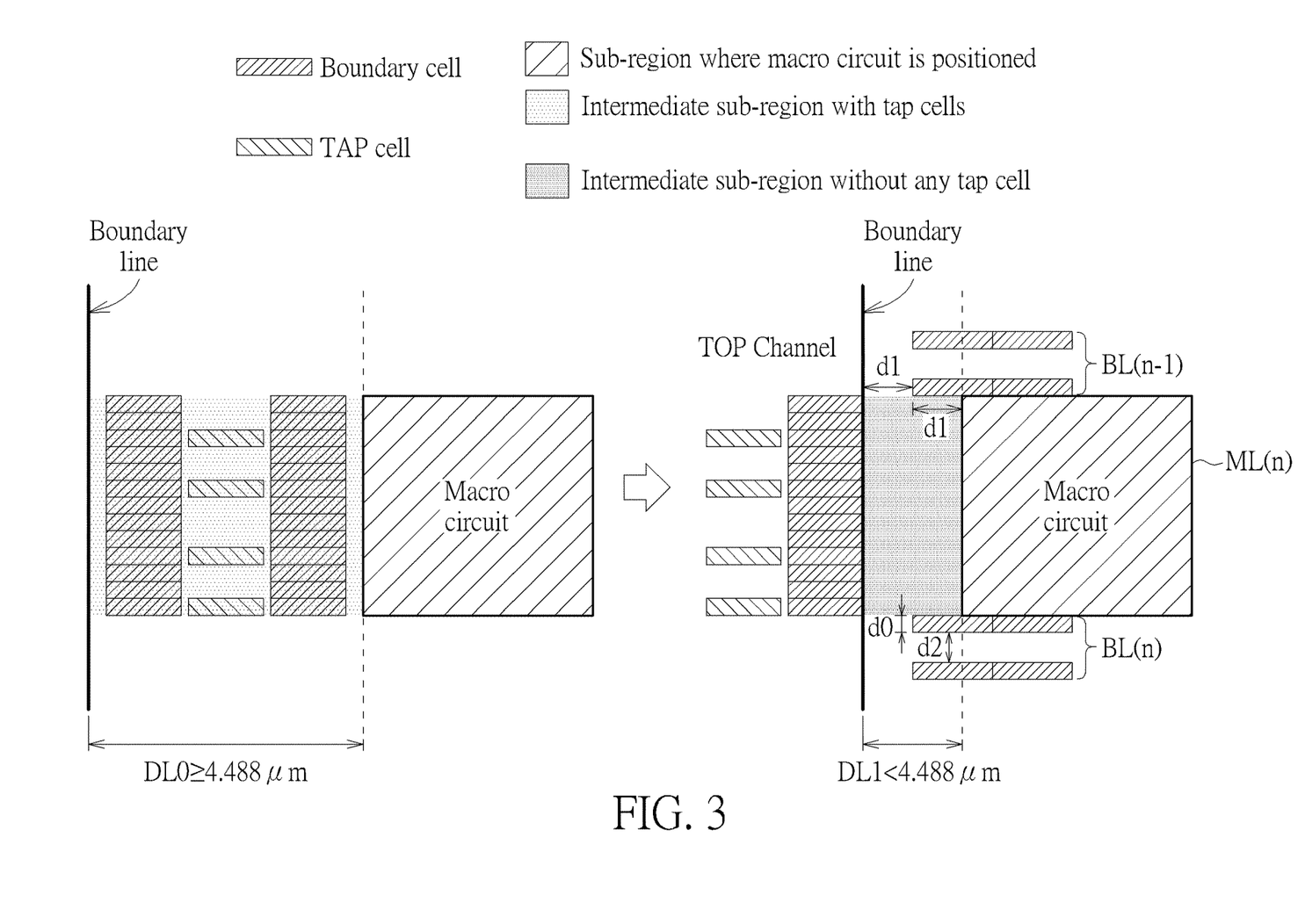
FIG. 3 is a diagram illustrating, in the right half thereof, some implementation details of the compact layout control scheme shown in FIG. 2 according to an embodiment of the present invention, where some implementation details of the non-compact layout control scheme are illustrated in the left half of FIG. 3 for better comprehension.

FIG. 3 is a diagram illustrating, in the right half thereof, some implementation details of the compact layout control scheme shown in FIG. 2 according to an embodiment of the present invention, where some implementation details of the non-compact layout control scheme are illustrated in the left half of FIG. 3 for better comprehension. The macro circuit shown in the left half of FIG. 3 can be taken as an example of any macro circuit among the macro circuits near the left boundary line within the functional block shown in the left half of FIG. 2. The intermediate sub-region between the boundary of the functional block and the macro circuit in this functional block may comprise a set of TAP cells such as four TAP cells (labeled "Intermediate sub-region with tap cells" for brevity), and more particularly, comprise a set of boundary cells positioned at one side of the set of TAP cells and further comprise another set of boundary cells positioned at the other side of the set of TAP cells, where the set of TAP cells, the set of boundary cells and the other set of boundary cells can be taken as examples of the multiple tap cells, the first 1D array of boundary cells and the second 1D array of boundary cells, respectively. As a result, the distance DL0 between the macro circuit and the left boundary line (labeled "Boundary line" for brevity) of the functional block is typically greater than or equal to 4.488 μm (labeled "DL0≥4.488 μm" for brevity).

The macro circuit ML(n) shown in the right half of FIG. 3 can be taken as an example of the aforementioned first macro circuit ML(n) among the first set of macro circuits ML(1), ML(2), . . . and ML(N) within the first functional block 110 shown in the right half of FIG. 2. The intermediate sub-region between the boundary of the first functional block 110 and the macro circuit ML(n) in the first functional block 110 does not comprise any tap cell (labeled "Intermediate sub-region without any tap cell" for brevity). As a result, the distance DL1 between the macro circuit ML(n) and the first boundary line (labeled "Boundary line" for brevity) of the first functional block 110 is less than 4.488 μm (labeled "DL1<4.488 μm" for brevity). According to this embodiment, the IC 100 may comprise some TAP cells in a TOP channel, such as a set of TAP cells (e.g., four TAP cells) that are positioned outside the first functional block 110 and close to the macro circuit ML(n), where the IC 100 may further comprise a set of boundary cells positioned between this set of TAP cells and the intermediate sub-region adjacent to the macro circuit ML(n). For example, the IC 100 may provide power to the macro circuit ML(n) through this set of TAP cells and the associated wiring, but the present invention is not limited thereto.

As shown in the upper right part and the lower right part of FIG. 3, the first functional block 110 may further comprise a set of boundary cells BL(n−1) and a set of boundary cells BL(n), where the set of boundary cells BL(n−1) and the set of boundary cells BL(n) can be implemented in the same or similar manner, but the present invention is not limited thereto. For example, when the macro circuit index n is not equal to one, the macro circuit index n can be equal to any of the integers in the interval [2, N]. In this situation, the set of boundary cells BL(n−1) can be positioned between the macro circuit ML(n) and a neighboring component (e.g., the macro circuit ML(n−1)) within the first functional block 110, wherein among the multiple sides of the first sub-region (e.g., the sub-region where the macro circuit ML(n) is positioned), a second side (e.g., the upper side) of the first sub-region is closest to the neighboring component. For another example, when the macro circuit index n is not equal to N, the macro circuit index n can be equal to any of the integers in the interval [1, (N−1)]. In this situation, the set of boundary cells BL(n) can be positioned between the macro circuit ML(n) and a neighboring component (e.g., the macro circuit ML(n+1)) within the first functional block 110, wherein among the multiple sides of the first sub-region (e.g., the sub-region where the macro circuit ML(n) is positioned), another second side (e.g., the lower side) of the first sub-region is closest to the neighboring component.

According to this embodiment, the distance between the first side (e.g., the left side) of the first sub-region (e.g., the sub-region where the macro circuit ML(n) is positioned) and the left side of any set of boundary cells among the set of boundary cells BL(n−1) and the set of boundary cells BL(n) can be equal to the distance d1 between the first boundary line (labeled "Boundary line" for brevity) of the first functional block 110 and the left side of the any set of boundary cells, and therefore can also be labeled "d1" as shown in FIG. 3, but the present invention is not limited thereto. For example, the distance between the first side of the first sub-region and the left side of the any set of boundary cells may vary, and more particularly, may be greater than d1. In addition, the width (e.g., the length measured in the vertical direction of FIG. 3) of each boundary cell of the any set of boundary cells among the set of boundary cells BL(n−1) and the set of boundary cells BL(n) can be equal to d0, and the distance between two subsets (e.g., two upper boundary cells and two lower boundary cells) of the any set of boundary cells can be equal to d2.

Figure 4:
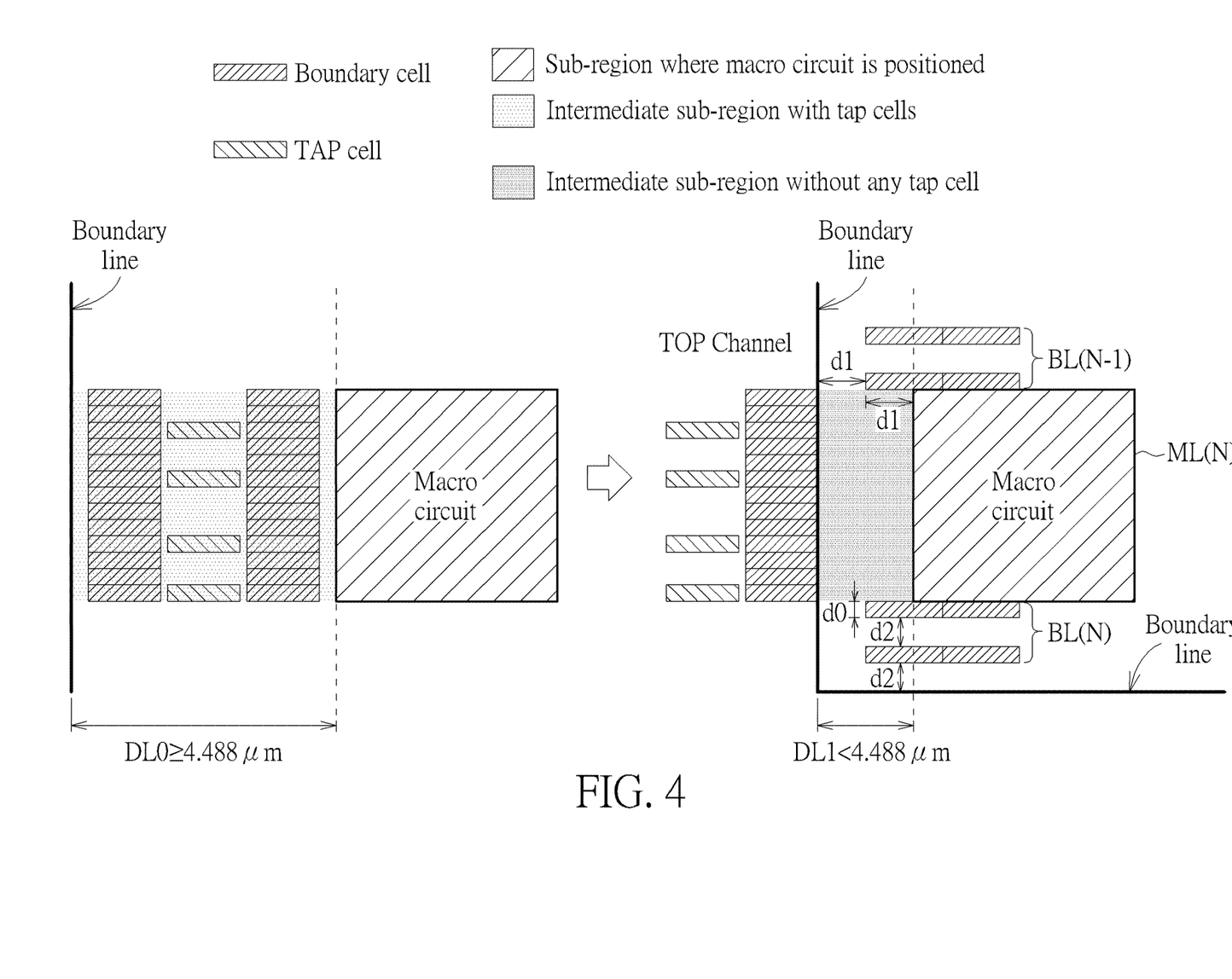
FIG. 4 is a diagram illustrating, in the right half thereof, some implementation details of the compact layout control scheme shown in FIG. 2 according to another embodiment of the present invention, where some implementation details of the non-compact layout control scheme are illustrated in the left half of FIG. 4 for better comprehension.

FIG. 4 is a diagram illustrating, in the right half thereof, some implementation details of the compact layout control scheme shown in FIG. 2 according to another embodiment of the present invention, where some implementation details of the non-compact layout control scheme are illustrated in the left half of FIG. 4 for better comprehension. In comparison with the embodiment shown in FIG. 3, the macro circuit index n of the macro circuit ML(n) can be equal to N in this embodiment. In this situation, the set of boundary cells BL(N−1) can be positioned between the macro circuit ML(N) and a neighboring component (e.g., the macro circuit ML(N−1)) within the first functional block 110, wherein among the multiple sides of the first sub-region (e.g., the sub-region where the macro circuit ML(N) is positioned), the second side (e.g., the upper side) of the first sub-region is closest to the neighboring component. In addition, the set of boundary cells BL(N) can be positioned between the macro circuit ML(N) and a second boundary line (e.g., the lower boundary line, labeled "Boundary line" for brevity) of the multiple boundary lines, wherein among the multiple sides of the first sub-region (e.g., the sub-region where the macro circuit ML(N) is positioned), a third side (e.g., the lower side) of the first sub-region is closest to the second boundary line. For brevity, similar descriptions for this embodiment are not repeated in detail here.

In the embodiment shown in FIG. 4, the arrangement of the macro circuit ML(N) and the set of boundary cells BL(N) around the lower left corner of the first functional block 110 can be taken as an example of the arrangements around the four corners of the first functional block 110, but the present invention is not limited thereto. For example, the arrangement around the upper left corner of the first functional block 110 can be similar to the arrangement around the lower left corner of the first functional block 110, and more particularly, can be a mirrored version of the arrangement around the lower left corner of the first functional block 110 with respect to a first axis of symmetry (e.g., a central horizontal line passing through the center of the first functional block 110). According to an embodiment, the macro circuit index n of the macro circuit ML(n) in the architecture shown in FIG. 3 can be equal to one. In this situation, the set of boundary cells BL(1) can be positioned between the macro circuit ML(1) and a neighboring component (e.g., the macro circuit ML(2)) within the first functional block 110, wherein among the multiple sides of the first sub-region (e.g., the sub-region where the macro circuit ML(1) is positioned), the second side (e.g., the lower side) of the first sub-region is closest to the neighboring component. In addition, the set of boundary cells BL(0) can be positioned between the macro circuit ML(1) and a third boundary line (e.g., the upper boundary line) of the multiple boundary lines, wherein among the multiple sides of the first sub-region (e.g., the sub-region where the macro circuit ML(1) is positioned), a third side (e.g., the upper side) of the first sub-region is closest to the third boundary line. For brevity, similar descriptions for this embodiment are not repeated in detail here.

According to some embodiments, the arrangement around the lower right corner of the first functional block 110 can be similar to the arrangement around the lower left corner of the first functional block 110, and more particularly, can be a mirrored version of the arrangement around the lower left corner of the first functional block 110 with respect to a second axis of symmetry (e.g., a central vertical line passing through the center of the first functional block 110).

Figure 5:
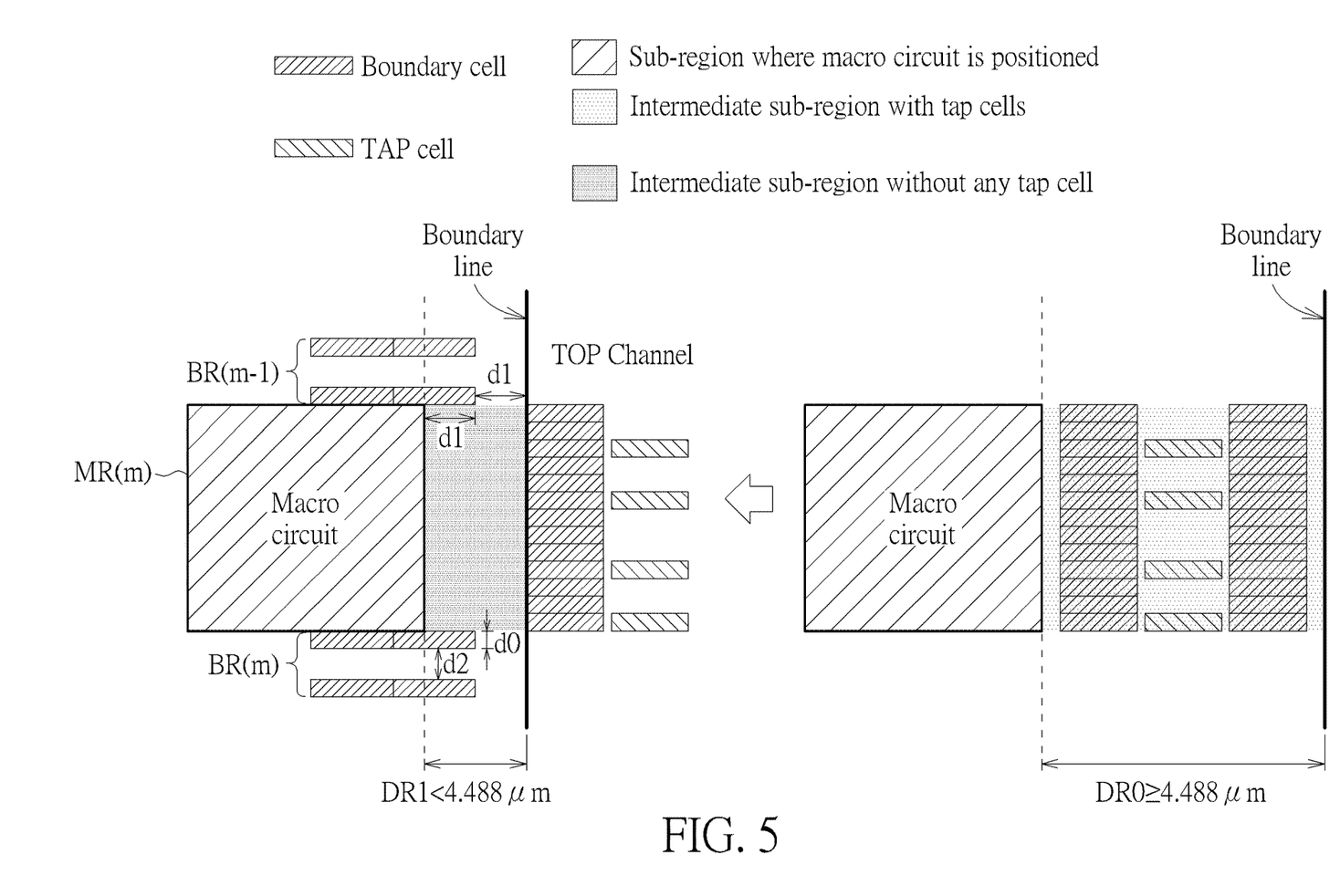
FIG. 5 is a diagram illustrating, in the left half thereof, some implementation details of the compact layout control scheme shown in FIG. 2 according to an embodiment of the present invention, where some implementation details of the non-compact layout control scheme are illustrated in the right half of FIG. 5 for better comprehension.

FIG. 5 is a diagram illustrating, in the left half thereof, some implementation details of the compact layout control scheme shown in FIG. 2 according to an embodiment of the present invention, where some implementation details of the non-compact layout control scheme are illustrated in the right half of FIG. 5 for better comprehension. The macro circuit shown in the right half of FIG. 5 can be taken as an example of any macro circuit among the macro circuits near the right boundary line within the functional block shown in the left half of FIG. 2. The intermediate sub-region between the boundary of the functional block and the macro circuit in this functional block may comprise a set of TAP cells such as four TAP cells (labeled "Intermediate sub-region with tap cells" for brevity), and more particularly, comprise a set of boundary cells positioned at one side of the set of TAP cells and further comprise another set of boundary cells positioned at the other side of the set of TAP cells, where the set of TAP cells, the set of boundary cells and the other set of boundary cells can be taken as examples of the multiple tap cells, the first 1D array of boundary cells and the second 1D array of boundary cells, respectively. As a result, the distance DR0 between the macro circuit and the right boundary line (labeled "Boundary line" for brevity) of the functional block is typically greater than or equal to 4.488 μm (labeled "DR0≥4.488 μm" for brevity).

The macro circuit MR(m) shown in the left half of FIG. 5 can be taken as an example of the aforementioned other first macro circuit MR(m) among the second set of macro circuits MR(1), MR(2), . . . and MR(M) within the first functional block 110 shown in the right half of FIG. 2. The intermediate sub-region between the boundary of the first functional block 110 and the macro circuit MR(m) in the first functional block 110 does not comprise any tap cell (labeled "Intermediate sub-region without any tap cell" for brevity). As a result, the distance DR1 between the macro circuit MR(m) and the first boundary line (labeled "Boundary line" for brevity) of the first functional block 110 is less than 4.488 μm (labeled "DR1<4.488 μm" for brevity). According to this embodiment, the IC 100 may comprise some TAP cells in a TOP channel, such as a set of TAP cells (e.g., four TAP cells) that are positioned outside the first functional block 110 and close to the macro circuit MR(m), where the IC 100 may further comprise a set of boundary cells positioned between this set of TAP cells and the intermediate sub-region adjacent to the macro circuit MR(m). For example, the IC 100 may provide power to the macro circuit MR(m) through this set of TAP cells and the associated wiring, but the present invention is not limited thereto.

As shown in the upper left part and the lower left part of FIG. 5, the first functional block 110 may further comprise a set of boundary cells BR(m−1) and a set of boundary cells BR(m), where the set of boundary cells BR(m−1) and the set of boundary cells BR(m) can be implemented in the same or similar manner, but the present invention is not limited thereto. For example, when the macro circuit index m is not equal to one, the macro circuit index m can be equal to any of the integers in the interval [2, M]. In this situation, the set of boundary cells BR(m−1) can be positioned between the macro circuit MR(m) and a neighboring component (e.g., the macro circuit MR(m−1)) within the first functional block 110, wherein among the multiple sides of the other first sub-region (e.g., the sub-region where the macro circuit MR(m) is positioned), a second side (e.g., the upper side) of the other first sub-region is closest to the neighboring component. For another example, when the macro circuit index m is not equal to M, the macro circuit index m can be equal to any of the integers in the interval [1, (M−1)]. In this situation, the set of boundary cells BR(m) can be positioned between the macro circuit MR(m) and a neighboring component (e.g., the macro circuit MR(m+1)) within the first functional block 110, wherein among the multiple sides of the other first sub-region (e.g., the sub-region where the macro circuit MR(m) is positioned), another second side (e.g., the lower side) of the other first sub-region is closest to the neighboring component.

According to this embodiment, the distance between the first side (e.g., the right side) of the other first sub-region (e.g., the sub-region where the macro circuit MR(m) is positioned) and the right side of any set of boundary cells among the set of boundary cells BR(m−1) and the set of boundary cells BR(m) can be equal to the distance d1 between the other boundary line (labeled "Boundary line" for brevity) of the first functional block 110 and the right side of the any set of boundary cells, and therefore can also be labeled "d1" as shown in FIG. 5, but the present invention is not limited thereto. For example, the distance between the first side of the other first sub-region and the right side of the any set of boundary cells may vary, and more particularly, may be greater than d1. In addition, the width (e.g., the length measured in the vertical direction of FIG. 5) of each boundary cell of the any set of boundary cells among the set of boundary cells BR(m−1) and the set of boundary cells BR(m) can be equal to d0, and the distance between two subsets (e.g., two upper boundary cells and two lower boundary cells) of the any set of boundary cells can be equal to d2.

Figure 6:
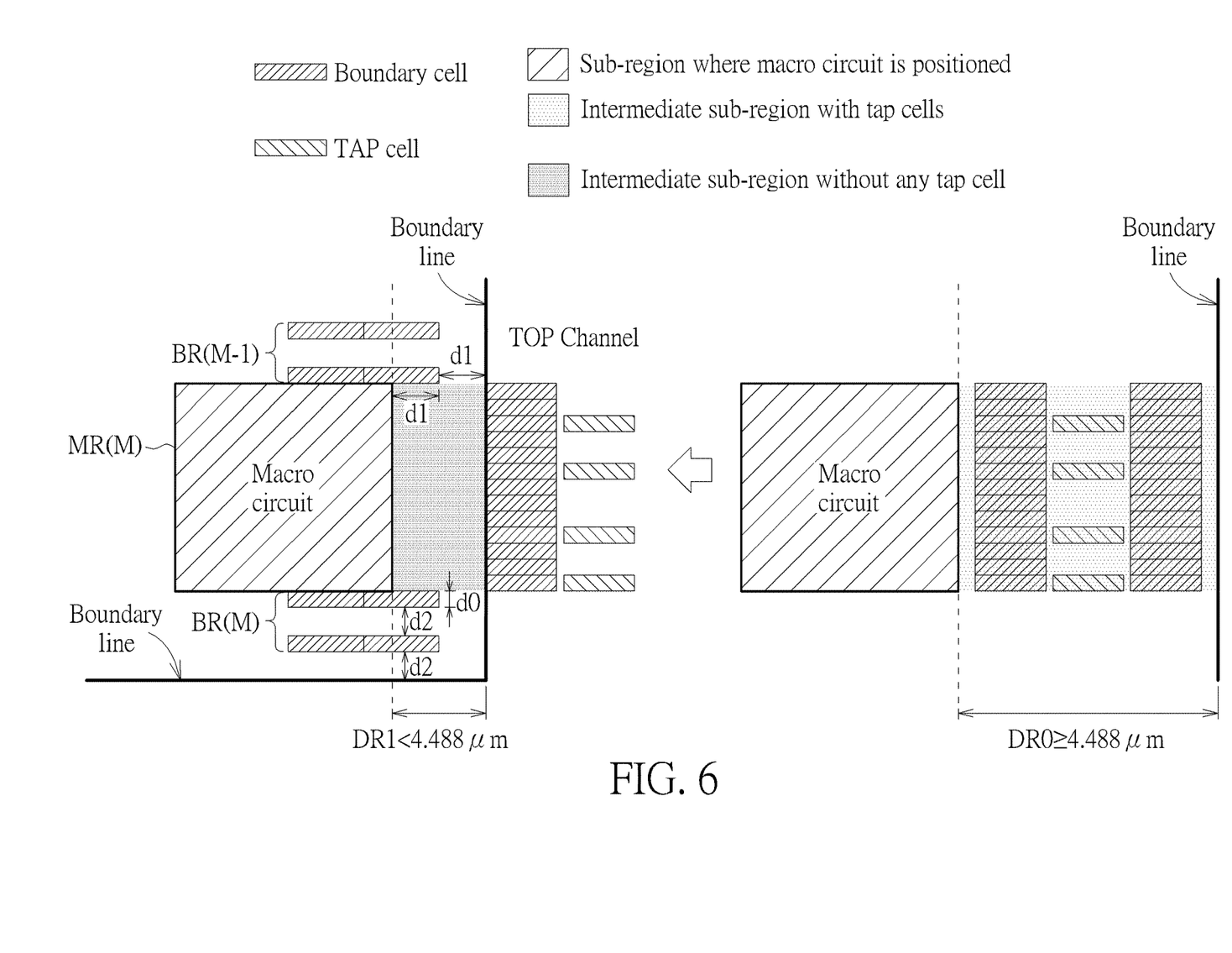
FIG. 6 is a diagram illustrating, in the left half thereof, some implementation details of the compact layout control scheme shown in FIG. 2 according to another embodiment of the present invention, where some implementation details of the non-compact layout control scheme are illustrated in the right half of FIG. 6 for better comprehension.

FIG. 6 is a diagram illustrating, in the left half thereof, some implementation details of the compact layout control scheme shown in FIG. 2 according to another embodiment of the present invention, where some implementation details of the non-compact layout control scheme are illustrated in the right half of FIG. 6 for better comprehension. In comparison with the embodiment shown in FIG. 5, the macro circuit index m of the macro circuit MR(m) can be equal to M in this embodiment. In this situation, the set of boundary cells BR(M−1) can be positioned between the macro circuit MR(M) and a neighboring component (e.g., the macro circuit MR(M−1)) within the first functional block 110, wherein among the multiple sides of the other first sub-region (e.g., the sub-region where the macro circuit MR(M) is positioned), the second side (e.g., the upper side) of the other first sub-region is closest to the neighboring component. In addition, the set of boundary cells BR(M) can be positioned between the macro circuit MR(M) and the second boundary line (e.g., the lower boundary line, labeled "Boundary line" for brevity) of the multiple boundary lines, wherein among the multiple sides of the other first sub-region (e.g., the sub-region where the macro circuit MR(M) is positioned), a third side (e.g., the lower side) of the other first sub-region is closest to the second boundary line. For brevity, similar descriptions for this embodiment are not repeated in detail here.

In the embodiment shown in FIG. 6, the arrangement of the macro circuit MR(M) and the set of boundary cells BR(M) around the lower right corner of the first functional block 110 can be taken as an example of the arrangements around the four corners of the first functional block 110, but the present invention is not limited thereto. For example, the arrangement around the upper right corner of the first functional block 110 can be similar to the arrangement around the lower right corner of the first functional block 110, and more particularly, can be a mirrored version of the arrangement around the lower right corner of the first functional block 110 with respect to the first axis of symmetry (e.g., the central horizontal line passing through the center of the first functional block 110). According to an embodiment, the macro circuit index m of the macro circuit MR(m) in the architecture shown in FIG. 5 can be equal to one. In this situation, the set of boundary cells BR(1) can be positioned between the macro circuit MR(1) and a neighboring component (e.g., the macro circuit MR(2)) within the first functional block 110, wherein among the multiple sides of the other first sub-region (e.g., the sub-region where the macro circuit MR(1) is positioned), the second side (e.g., the lower side) of the other first sub-region is closest to the neighboring component. In addition, the set of boundary cells BR(0) can be positioned between the macro circuit MR(1) and the third boundary line (e.g., the upper boundary line) of the multiple boundary lines, wherein among the multiple sides of the other first sub-region (e.g., the sub-region where the macro circuit MR(1) is positioned), a third side (e.g., the upper side) of the other first sub-region is closest to the third boundary line. In this embodiment, the arrangements around the lower right corner and the upper right corner of the first functional block 110 can be similar to the arrangements around the lower left corner and the upper left corner of the first functional block 110, respectively, and more particularly, can be the mirrored versions of the arrangements around the lower left corner and the upper left corner of the first functional block 110 with respect to the second axis of symmetry (e.g., the central vertical line passing through the center of the first functional block 110), respectively. For brevity, similar descriptions for this embodiment are not repeated in detail here.

Figure 7:
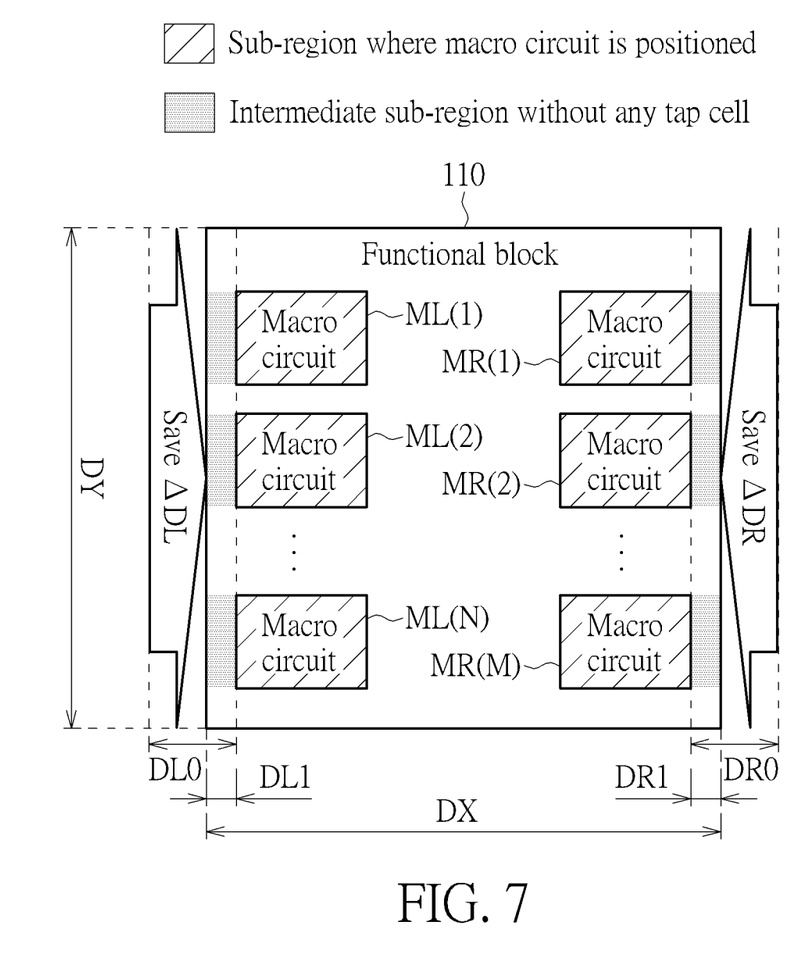
FIG. 7 is a diagram illustrating an improvement that is achieved by using the method according to an embodiment of the present invention.

FIG. 7 is a diagram illustrating an improvement that is achieved by using the method according to an embodiment of the present invention. In comparison with the functional block in the IC implemented according to the non-compact layout control scheme, the first functional block 110 in the IC 100 implemented according to the compact layout control scheme can save an unnecessary circuit area corresponding to the difference $\Delta DL$ between the distance DL0 and the distance DL1 (labeled "Save $\Delta DL$" for brevity) and save an unnecessary circuit area corresponding to the difference $\Delta DR$ between the distance DR0 and the distance DR1 (labeled "Save $\Delta DR$" for brevity), where $\Delta DL=(DL0-DL1)$ and $\Delta DR=(DR0-DR1)$. For better comprehension, assume that the size of the first functional block 110 in the horizontal direction of FIG. 7 is equal to DX and the size of the first functional block 110 in the vertical direction of FIG. 7 is equal to DY, and therefore the circuit area of the first functional block 110 in the IC 100 is equal to (DX*DY). In this situation, the improvement in reducing the circuit area can be expressed with an area reduction rate $R_{AR}$ as shown below:

$$R_{AR}=(((\Delta DL+\Delta DR)*DY)/((DX+\Delta DL+\Delta DR)*DY)); \text{ or}$$

$$R_{AR}=((\Delta DL+\Delta DR)/(DX+\Delta DL+\Delta DR));$$

but the present invention is not limited thereto. For example, when DX=DY=1000 μm and $\Delta DL=\Delta DR=3.06$ μm (e.g., DL0=DR0=4.488 μm and DL1=DR1=1.428 μm), $R_{AR}=$ ((3.06+3.06)/(1000+3.06+3.06))=0.0060827 . . . ≈0.61%. More particularly, a typical area reduction rate $R_{AR\_TYP}$ for all functional blocks among the plurality of functional blocks of the IC 100, such as an average area reduction rate $R_{AR\_AVG}$ for all functional blocks among the plurality of functional blocks, can be equal to the area reduction rate $R_{AR}$ (e.g., $R_{AR\_TYP}=R_{AR\_AVG}=R_{AR}=0.61\%$). Therefore, the IC 100 can operate correctly in various situations while the overall circuit area of the IC 100 has been further reduced. As a result, the associated cost can be further reduced correspondingly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An integrated circuit (IC), comprising:
a plurality of functional blocks, each functional block of the plurality of functional blocks comprising hardware circuits, wherein the plurality of functional blocks comprises:
a first functional block, comprising:
a first macro circuit, positioned within a first sub-region of the first functional block, wherein among multiple sides of the first sub-region, a first side of the first sub-region is closest to a boundary of the first functional block;
wherein a first intermediate sub-region of the first functional block is positioned between the first side of the first sub-region and the boundary of the first functional block, at least one tap cell is implemented outside the first functional block, and there is no tap cell in the first intermediate sub-region of the first functional block wherein the boundary of the first functional block comprises multiple boundary lines, and the first intermediate sub-region of the first functional block is positioned between the first side of the first sub-region and a first boundary line of the multiple boundary lines; and the first functional block further comprises:

a second macro circuit, positioned within a second sub-region of the first functional block, wherein among multiple sides of the second sub-region, a first side of the second sub-region is closest to the first boundary line;

wherein a second intermediate sub-region of the first functional block is positioned between the first side of the second sub-region and the first boundary line, and there is no tap cell in the second intermediate sub-region of the first functional block.

2. The IC of claim 1, wherein the first macro circuit is a Static Random Access Memory (SRAM).

3. The IC of claim 1, wherein a distance between the first side of the first sub-region and the boundary of the first functional block is less than 4.488 micrometers (μm).

4. The IC of claim 1, wherein the first functional block further comprises:

a third macro circuit, positioned within a third sub-region of the first functional block, wherein among multiple sides of the third sub-region, a first side of the third sub-region is closest to another boundary line of the multiple boundary lines;

wherein a third intermediate sub-region of the first functional block is positioned between the first side of the third sub-region and said another boundary line, and there is no tap cell in the third intermediate sub-region of the first functional block.

5. The IC of claim 4, wherein at least one macro circuit among the first macro circuit, the second macro circuit and the third macro circuit is a Static Random Access Memory (SRAM).

6. The IC of claim 1, wherein any of the first macro circuit and the second macro circuit is a Static Random Access Memory (SRAM).

7. The IC of claim 1, wherein the first functional block further comprises:

a first set of boundary cells, positioned between the first macro circuit and a neighboring component within the first functional block, wherein among the multiple sides of the first sub-region, a second side of the first sub-region is closest to the neighboring component.

8. The IC of claim 7, wherein the neighboring component represents the second macro circuit that is positioned within the second sub-region of the first functional block.

9. The IC of claim 7, wherein the first functional block further comprises:

a second set of boundary cells, positioned between the first macro circuit and a second boundary line of the multiple boundary lines, wherein among the multiple sides of the first sub-region, a third side of the first sub-region is closest to the second boundary line.

* * * * *